A. G. OLSEN.
TRACTOR.
APPLICATION FILED OCT. 6, 1916.

1,249,996.

Patented Dec. 11, 1917.
3 SHEETS—SHEET 3.

WITNESSES

INVENTOR
A. G. Olsen
BY
ATTORNEYS

UNITED STATES PATENT OFFICE.

ALFRED GERHARD OLSEN, OF ELKHORN, WISCONSIN.

TRACTOR.

1,249,996.

Specification of Letters Patent.   Patented Dec. 11, 1917.

Application filed October 6, 1916.   Serial No. 124,035.

*To all whom it may concern:*

Be it known that I, ALFRED G. OLSEN, a citizen of the United States, and a resident of Elkhorn, in the county of Walworth and State of Wisconsin, have invented certain new and useful Improvements in Tractors, of which the following is a specification.

My invention relates to tractors and one of the main objects thereof is to provide means for steering the drive wheels whereby very sharp turns may be made, other tractors known to me being limited for the reason that it is impossible to individually control the direction of the traction wheels and it was in order to overcome this defect that my invention was conceived.

My invention is fully described in the following specification, of which the accompanying drawings form a part, in which like characters refer to like parts in each of the views, and in which:—

Figure 1:
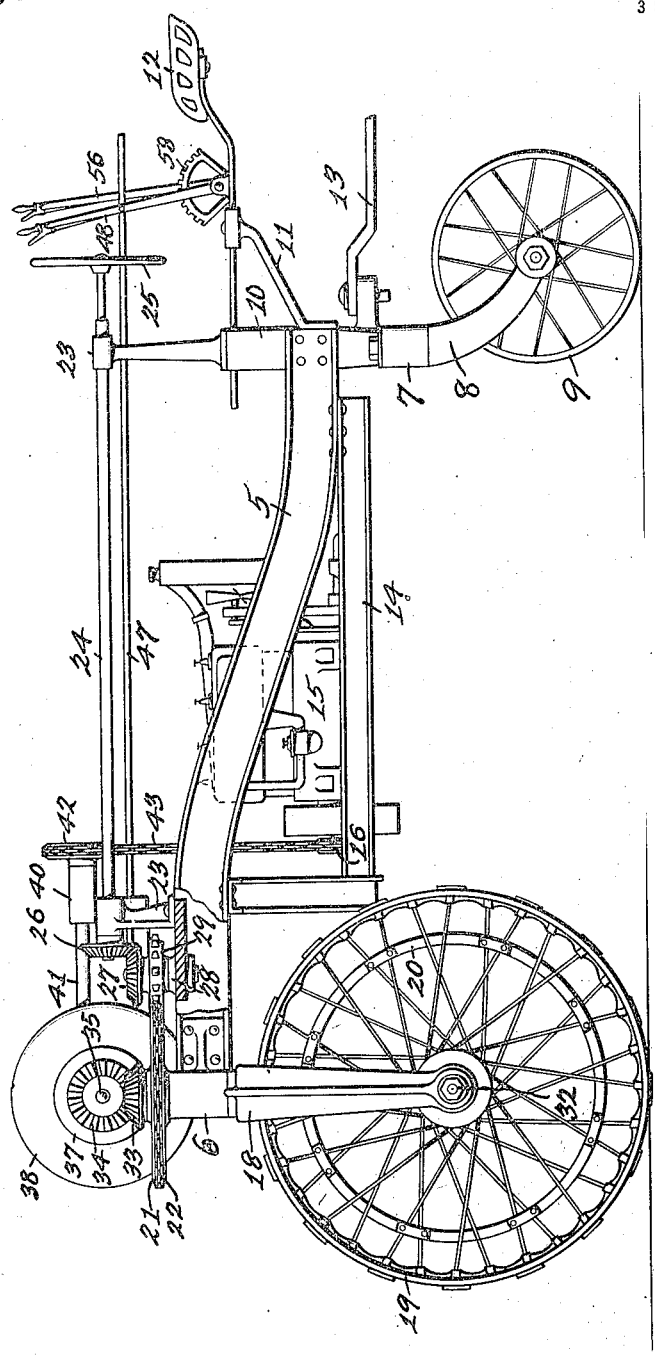
Figure 1 is a side elevation of a tractor constructed in accordance with my invention.
Figure 2:
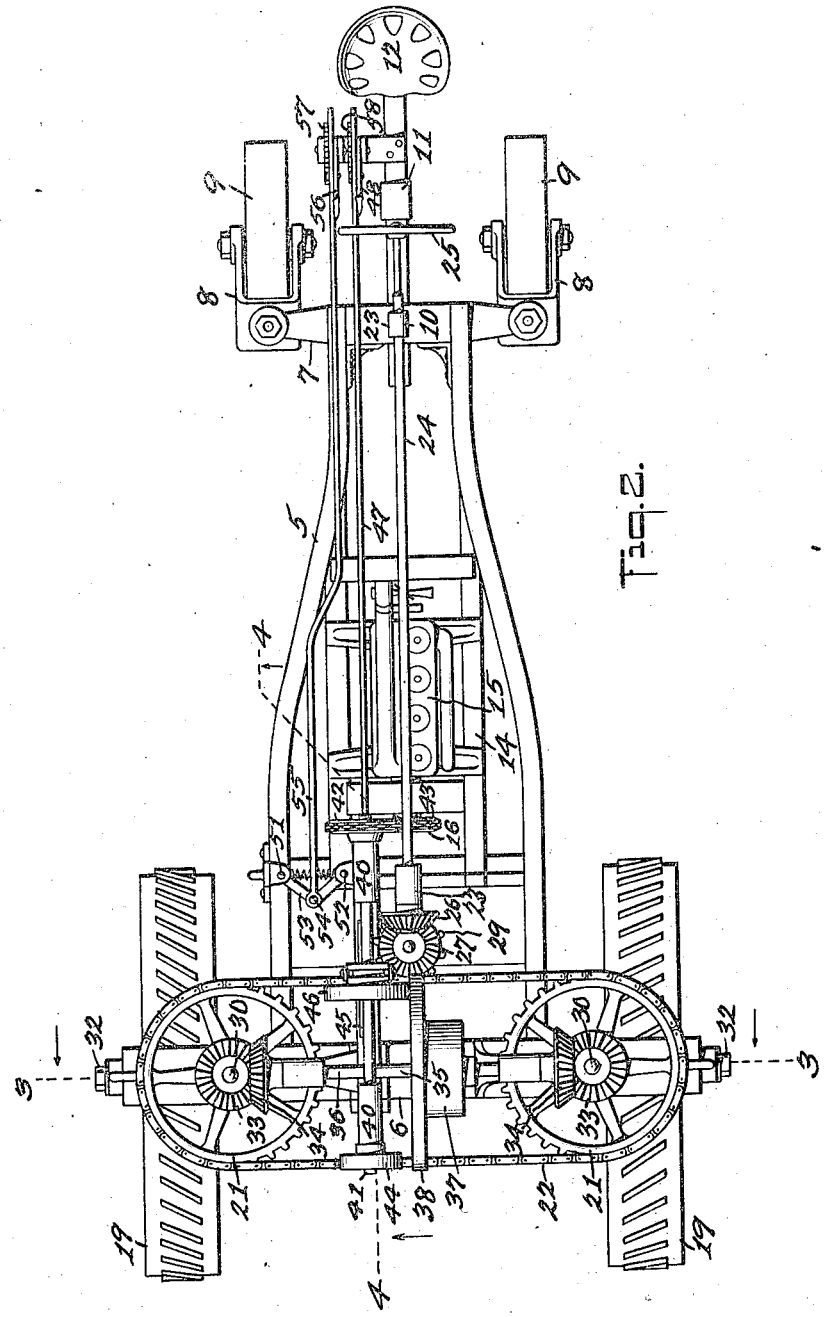
Fig. 2 is a top plan view thereof.
Figure 3:
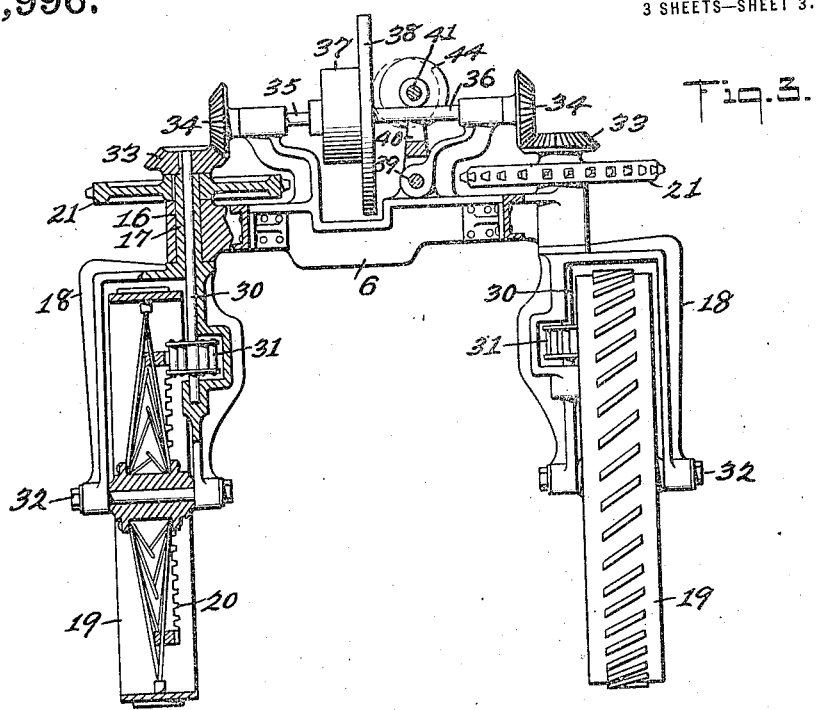
Fig. 3 is a section taken on the line 3—3 of Fig. 2.

Referring to the drawings, 5 is a main frame having a cross-head 6 at the forward end thereof and a cross-head 7 at the rear end thereof, the latter being supported by two forks 8 freely rotatable on vertical axes and in turn supported by trailer wheels 9, a steering column 10 being erected over the latter cross-head and a bracket 11 being carried by the said column and serving as a support for a horizontally adjustable seat 12 as well as for a pivotally mounted drawbar 13 for connection with the vehicle or implement to be drawn.

A supplemental frame 14 is dependent from the main frame 5 and serves as a support for a motor 15, shown as an internal combustion engine, and the crank-shaft of which is provided with a sprocket-wheel 16 at its forward end.

The forward cross-head 6 is provided with vertical bores 16 adjacent its ends within which are rotatable tubes 17 integral with offset forks 18 at their lower ends for the tractor wheels 19 having, each, a gear 20 secured to the inner side thereof, the upper ends of said tubes 17 having sprocket-wheels 21 keyed thereon and connected with said sprocket-wheels 21 is an endless chain 22 the actuation of which in either direction will rotate the tubes 17 correspondingly and thus swing the tractor wheels 19 about the axes of the said tubes and cause a corresponding change in direction of movement of the tractor.

Rotatable in suitable supports 23 is a shaft 24 having a hand-wheel 25 at its rear end and a bevel gear 26 at its forward end enmeshed with a similar gear 27 rotatable on a support 28 and having a sprocket-wheel 29 secured thereto in any desired manner whereby the latter may be enmeshed with the chain 22 and, when the hand-wheel 25 is revolved, the tractor is steered accordingly.

Rotatable within the tubes 17 are shafts 30 carrying two-walled pinions 31 at their lower ends the teeth of which pinions are formed by sleeves freely rotatable upon spindles joining said pinion walls although I do not limit myself to any particular type of pinions provided that they are of a type adapted to enmesh with the respective gears 20 to revolve the traction wheels 19 about their spindles 32 when the shafts 30 are rotated.

The upper ends of the shafts 30 carry bevel gears 33 enmeshed with similar gears 34 on countershafts 35 and 36 in operative connection through a differential within a housing 37, said differential not being shown as it may be of any of a number of well known forms, and the shaft 36 has a drive disk 38 keyed thereto forming a part of a disk drive.

Pivoted at 39 is a yoke 40 carrying a drive shaft 41 having a sprocket 42 at the rear end thereof connected with the sprocket 16 of the motor by means of a chain 43, the other end of said drive shaft having a disk 44 immovably secured thereto and adapted to engage with the drive disk 38 to reverse the tractor in a manner to be described.

Figure 4:
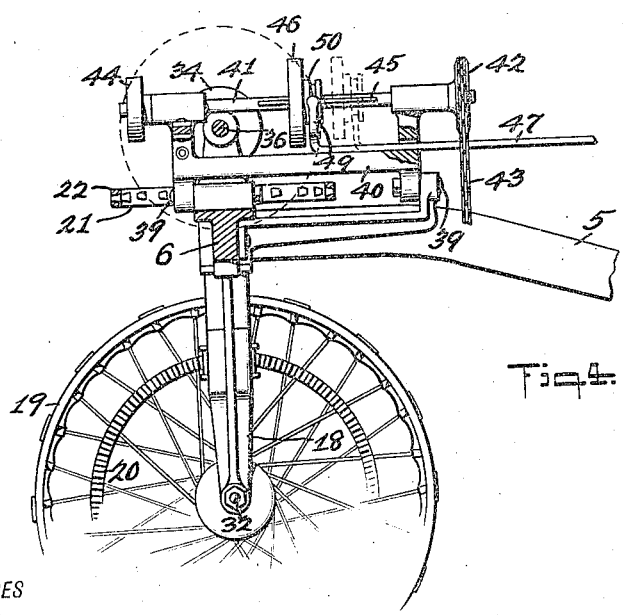
Fig. 4 is a section taken on the line 4—4 of Fig. 2.

The drive shaft 41 has a feather 45 thereon engaging a slidable disk 46 of a greater diameter than the disk 44 and adapted to be slid along said feather by means of a bar 47 in pivotal connection at its rear end with a hand lever 48 adjacent the seat 12 and having a forked member 49 at its forward end in operative connection with a grooved block 50 on the disk 46 the range of sliding movement of the disk 46 being sufficient to carry it well toward the axis of the drive disk 38 and also outside the periphery of said drive disk as indicated by dotted lines in Fig. 4.

Pivoted at 51 to the main frame 5 and at 52 to the yoke 40 is a toggle lever 53 the central pivot 54 of which is carried by a rod 55 extended to the rear of the tractor and pivotally connected with a hand lever 56 adjacent the driver's seat, a toothed segment 57 being provided for locking the lever 56 in desired adjustment and I also provide a similar segment 58 for the lever 48 which controls the sliding movement of the friction disk 46, and, when the lever 56 is drawn rearwardly of the tractor, the yoke 40 is swung on its pivot to carry one or the other of the friction disks 44 and 46 into engagement with the drive disk 38.

When the lever 56 is thus moved, if the friction disk 46 be within the periphery of the drive disk 38, the former engages with the latter and the tractor moves forwardly at a speed determined by the adjustment of the friction disk 46 toward or from the axis of the drive disk 38, and it will be seen that the start, stop, and speed forwardly of the tractor is under the control of the driver from the seat 12.

When it is desired to reverse the tractor the friction disk 46 is drawn rearwardly and outwardly of the periphery of the drive disk 38, thus permitting the engagement of the smaller friction disk 44 with the drive disk 38 when the hand lever 56 is drawn rearwardly and the direction of the drive disk 38 is thus reversed.

By these means entire control of the tractor rests with the driver on the seat 12 and he may steer the tractor to the right or left and make very sharp turns without interfering in any manner with the drive of the traction wheels despite the fact that these are also the steering wheels and one of the main structural features of the tractor is that of the offset traction wheels which permits the revolution thereof about the axes of the pinions 31 to enable the said traction wheels to serve also as the steering wheels.

My invention is very simple in construction and use, is composed of relatively few parts not likely to get out of order, is adapted to drawing implements or vehicles of different kinds, is comparatively inexpensive, and, by the mere lengthening of the control means to compensate for the horizontal adjustment of the driver's seat, one man may control both the tractor and the article, vehicle, or implement drawn thereby.

Having fully described my invention, what I claim as new, and desire to secure by Letters Patent, is:—

1. In a tractor, a frame, vertical tubes rotatable therein, offset yokes carried by said tubes, traction wheels in said yokes, a sprocket on each tube, an endless chain passing around said sprockets, and means for moving said chain to revolve said wheels about vertical axes to steer said tractor, said means comprising a sprocket wheel adjacent one run of the said chain and meshing therewith, and means for operating the sprocket wheel.

2. In a tractor, a frame, vertical tubes rotatable therein, offset yokes carried by said tubes, traction wheels in said yokes, a gear on inner side of each wheel, a shaft in each tube, a pinion on each shaft enmeshed with the respective gear of the said wheels, means for rotating said shafts to propel said tractor, and means for rotating said tubes to steer said tractor.

3. In a tractor, a frame, vertical tubes rotatable therein, offset yokes carried by said tubes, traction wheels in said yokes, means for rotating said tubes to steer said tractor, a shaft in each tube, a pinion on each shaft, a gear on each wheel enmeshed with the respective pinion, a motor, and means including a pair of friction disks one of which is adjustable and a differential for rotating said shafts to propel said tractor.

4. In a tractor, a pair of traction wheels, means for revolving the same about vertical axes to steer said tractor, a drive disk in operative connection with said wheels, a pivoted yoke, a drive shaft rotatable therein, a friction disk slidably keyed on said shaft, a motor in operative connection with said shaft, and means for moving said friction disk toward said drive disk to engage the latter to propel said tractor.

5. In a tractor, a pair of traction wheels, means for revolving the same about vertical axes to steer said tractor, a drive disk in operative connection with said wheels, a pivoted yoke, a drive shaft rotatable therein, a friction disk slidably keyed to said shaft, a friction disk of less diameter than said first named friction disk secured to said shaft, a motor in operative connection with said shaft, means for sliding said slidable friction disk inside or outside the periphery of said drive disk, and means for swinging said yoke on its pivot to carry one or the other of said friction disks into frictional contact with said drive disk.

6. In a tractor, traction wheels, a disk, gearing between the disk and wheels, a pivoted support, a driven shaft mounted in said support, friction disks of different sizes on the shaft, the smaller disk being fixed and the larger one slidable on the shaft, means for sliding the slidable disk on said shaft, and means for swinging the said support.

7. In a tractor, traction wheels, a disk gearing between the disk and traction wheels, a pivoted support, a driven shaft mounted in the support, friction disks of different sizes on the shaft, the smaller disk being fixed and the larger one slidable on the shaft, means for sliding the slidable disk on the shaft, a toggle lever one member of which is pivoted to the pivoted support, and an operating rod connected with the toggle lever.

ALFRED GERHARD OLSEN.